(12) United States Patent
Mikolajczak

(10) Patent No.: US 8,619,397 B2
(45) Date of Patent: Dec. 31, 2013

(54) NON-LINEAR POWER MANAGEMENT DEVICE FOR INPUT POWER PROTECTION

(75) Inventor: Adrian Mikolajczak, Los Altos, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 191 days.

(21) Appl. No.: 13/225,713

(22) Filed: Sep. 6, 2011

(65) Prior Publication Data

US 2012/0194953 A1    Aug. 2, 2012

Related U.S. Application Data

(60) Provisional application No. 61/437,863, filed on Jan. 31, 2011.

(51) Int. Cl.
    *H02H 9/00*    (2006.01)
(52) U.S. Cl.
    USPC .......................................................... 361/56
(58) Field of Classification Search
    USPC .......................................................... 361/56
    See application file for complete search history.

(56) References Cited

U.S. PATENT DOCUMENTS

| 6,137,338 | A | * | 10/2000 | Marum et al. | 327/318 |
| 6,937,454 | B2 | | 8/2005 | Mikolajczak et al. | |
| 7,164,185 | B1 | * | 1/2007 | Salman et al. | 257/546 |
| 2002/0125931 | A1 | * | 9/2002 | Yue et al. | 327/310 |
| 2004/0164355 | A1 | * | 8/2004 | Litwin et al. | 257/355 |
| 2005/0057867 | A1 | * | 3/2005 | Harris et al. | 361/56 |

OTHER PUBLICATIONS

Littelfuse, "Application Note: Tips for Enhancing ESD Protection", Littelfuse, Inc, (2009), pp. 1-4.

* cited by examiner

*Primary Examiner* — Scott Bauer
(74) *Attorney, Agent, or Firm* — Brake Hughes Bellermann LLP

(57) ABSTRACT

In one general aspect, an apparatus can include a non-linear power management device having an output terminal configured to be coupled to an output shunt device configured to shunt energy in response to a voltage across the output shunt device exceeding a trigger voltage of the output shunt device. The non-linear power management device can be configured to change to a saturation mode in response to a first current associated with an energy pulse through the non-linear power management device. The apparatus can include an input shunt device coupled to an input terminal of the non-linear power management device and having a trigger voltage higher than the trigger voltage of the output shunt device. The input shunt device can be configured to shunt a second current associated with the energy pulse in response to a voltage drop across the non-linear power management device.

34 Claims, 8 Drawing Sheets

NON-LINEAR POWER MANAGEMENT DEVICE FOR INPUT POWER PROTECTION

RELATED APPLICATION

This application claims priority to and the benefit of U.S. Provisional Patent Application Ser. No. 61/437,863, filed on Jan. 31, 2011, entitled, "Non-Linear Power Management Device for Input Power Protection," which is incorporated herein by reference in its entirety.

TECHNICAL FIELD

This description relates to an input power port protection device.

BACKGROUND

Input power ports and/or related components can be protected from undesirable power conditions (e.g., electrostatic discharge (ESD)) using multiple external (e.g., off-board) and/or internal (e.g., on-board) discrete devices such as shunt devices (e.g., zener diodes, TVS devices). When the input power port is protected from undesirable power conditions using multiple devices, unpredictable and/or unwanted interactions can occur between the external and/or internal devices. For example, mismatches between external shunt protection devices added to an integrated circuit, which already includes an internal shunt protection device, can result in unpredictable and/or unwanted interactions in the event of an ESD pulse. Specifically, an internal shunt protection device that has a lower trigger voltage may absorb all energy of the ESD pulse, rendering the external shunt protection devices irrelevant, independent of its "power rating". In some embodiments, the external and internal shunt protection devices may share the energy of the ESD pulse in some fashion that may or may not protect the integrated circuit. Designing matched internal and external shunt protection devices to avoid many of these issues can be a time-consuming, expensive, and/or trial-and-error process, which may not be feasible in some applications. In addition, common methods of balancing (e.g., adding a series resistor) can have an undesirable level of series resistance during normal operation that can cause, for example, signal attenuation. Thus, a need exists for systems, methods, and apparatus to address the shortfalls of present technology and to provide other new and innovative features.

SUMMARY

In one general aspect, an apparatus can include a non-linear power management device having an output terminal configured to be coupled to an output shunt device configured to shunt energy in response to a voltage across the output shunt device exceeding a trigger voltage of the output shunt device. The non-linear power management device can be configured to change to a saturation mode in response to a first current associated with an energy pulse through the non-linear power management device. The apparatus can include an input shunt device coupled to an input terminal of the non-linear power management device and having a trigger voltage higher than the trigger voltage of the output shunt device. The input shunt device can be configured to shunt a second current associated with the energy pulse in response to a voltage drop across the non-linear power management device.

In another general aspect, a method can include receiving a current at a non-linear power management device. At least a first portion of the current can be passed through the non-linear power management device and shunted through a first shunt device, which is operably coupled to the non-linear power management device, in response to a voltage across the first shunt device exceeding a trigger voltage of the first shunt device. The method can also include changing the non-linear power management device to a saturation mode in response to a second portion of the current through the non-linear power management device larger than the first current, and can also include increasing, while in the saturation mode, a voltage at an input terminal of the non-linear power management device until the voltage exceeds a trigger voltage of a second shunt device greater than the trigger voltage of the first shunt device.

In yet another general aspect, an apparatus can include an input terminal configured to be coupled to an input shunt device, and an output terminal configured to be coupled to an output shunt device. The apparatus can also include a non-linear element disposed between the input terminal and the output terminal. The non-linear element can have a non-linear current-voltage behavior, and the non-linear element can be configured to trigger the input shunt device to change to a shunting state in response to a current drawn through the non-linear element by the output shunt device.

The details of one or more implementations are set forth in the accompanying drawings and the description below. Other features will be apparent from the description and drawings, and from the claims.

DETAILED DESCRIPTION

Figure 1A:
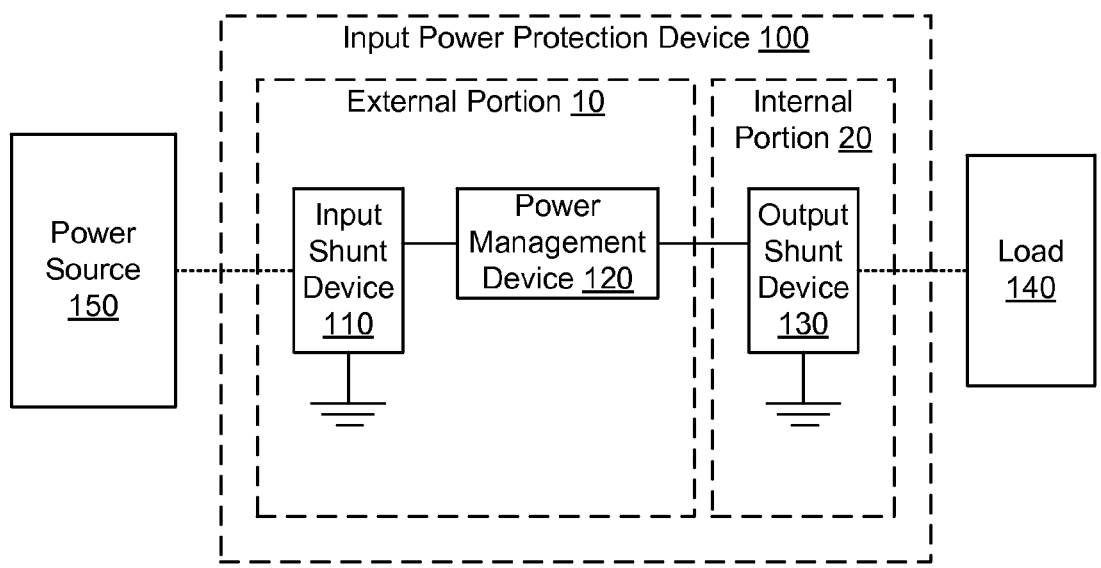
FIG. 1A is a block diagram that illustrates an external portion and an internal portion of an input power protection device.

FIG. 1A is a block diagram that illustrates an external portion 10 and an internal portion 20 of an input power protection device 100. The input power protection device 100 includes input shunt device 110 and output shunt device 130. As shown in FIG. 1A, a power management device 120 is serially coupled between the input shunt device 110 and the output shunt device 130. In this embodiment, the input shunt device 110 and the power management device 120 are included in the external portion 10 of the input power protection device 100, and the output shunt device 130 is included in the internal portion 20 of the input power protection device 100. In some embodiments, the power management device 120 can be referred to as a non-linear current device or as a current ballast device. In some embodiments, the input shunt device 110, the power management device 120, and/or the output shunt device 130 can collectively be referred to as components of the input power protection device 100.

The internal portion 20 of the input power protection device 100 can be referred to as an internal portion because the components of the internal portion 20 are included in (e.g., integrated within) an integrated circuit (IC) of a device (e.g., a computing device) (not shown). The external portion 10 of the input power protection device 100 can be referred to as an external portion because the components of the external portion 10 are coupled to (e.g., added to) the internal portion 20 and may not be integrated into the integrated circuit including the internal portion 20. Thus, the components of the external portion 10 may be included in a device (e.g., discrete component(s)) that is separate from a device (e.g., discrete component(s)) of the internal portion 20. In other words, the input shunt device 110 and the power management device 120 can be integrated into a standalone (e.g., single), discrete component (which can include a single or common semiconductor substrate) defining the external portion 10. In some embodiments, the internal portion 20 of the input power protection device 100 can be integrated with at least a portion of a load 140 (e.g., can be on-board with the load 140). In some embodiments, any combination of elements (e.g., input shunt device 110, power management device 120, and output shunt device 130) of the input protection device 100 can be integrated into a standalone (e.g., single), discrete component (which can include a single or common semi-conductor substrate). For example, the input shunt device 110 can be a spark-gap device integrated with a power management device 120 that includes a junction field effect transistor (JFET) device (or a JFET-like device, a JFET-based device).

In some embodiments, the external portion 10 can be referred to as an off-board portion and the internal portion can be referred to as an on-board portion. In some embodiments, the input shunt device 110 included in the external portion 10 can be referred to as an external shunt device, and the output shunt device 130 included in the internal portion 20 can be referred to as an internal shunt device. The input shunt device 110 can be referred to as an input shunt device because the input shunt device 110 is coupled to (e.g., is disposed on) an input side of the power management device 120. The output shunt device 130 can be referred to as an output shunt device because the output shunt device 130 is coupled to (e.g., is disposed on) an output side of the power management device 120.

The input power protection device 100 is configured to provide power (e.g., energy) protection to the load 140 from one or more undesirable power (e.g., energy) conditions related to, for example, an electrostatic discharge (ESD) (e.g., an ESD pulse), an inductive energy transient (e.g., an inductive spike), and/or so forth. In some embodiments, the undesirable power conditions (which can include an overvoltage condition and/or an overcurrent condition) may be produced by a power source 150. In some embodiments, the undesirable power condition can include power source noise, a current spike (caused by a downstream overcurrent event such as a short), and/or so forth.

For example, the load 140 may include electronic components (e.g., sensors, transistors, microprocessors, application-specific integrated circuits (ASICs), discrete components, circuit board) that could be damaged in an undesirable fashion by relatively fast increases in current and/or voltage produced by the power source 150. Accordingly, the input power protection device 100 can be configured to detect and prevent these relatively fast increases in current and/or voltage from damaging the load 140 and/or other components associated with the load 140 (such as a circuit board). In some embodiments, the power protection device 100 may be associated with a signal. In other words, the input power protection device 100 may be included in a data line (e.g., a signaling line) of an integrated circuit (e.g., the load 140).

One or more of the shunt devices 110, 130 can be any type of device (e.g., active device and/or passive device) configured to redirect power (e.g., energy) associated with an undesirable power condition (e.g., an ESD event). Specifically, the shunt devices 110, 130 can be configured to shunt power (e.g., energy) to ground (e.g., a ground node) to protect the load 140 at a trigger voltage (also can be referred to as a clamping voltage, an activation voltage, a breakdown voltage, and/or as a breakover voltage). In other words, the shunt devices 110, 130 can be activated in response to a trigger voltage being exceeded (e.g., exceeded to a certain extent, and/or for a specified period of time). When activated (e.g., changed from a deactivated state, inactive state, or non-shunting state), the shunt devices 110, 130 can be referred to as being in a shunted state. In some embodiments, when one or more of the shunt devices 110, 130 is actively engaged in power protection (e.g., actively shunting power away from the load 140) the shunt device(s) 110, 130 can be referred to as being in an on-state (e.g., an active state, turned on). In some embodiments, the trigger voltage can be, for example, between millivolts and volts. For example, the trigger voltage can be 0.5 volts, 1.5 volts, 5 volts, 50 volts, and so forth. Although not shown, in some embodiments, the shunt devices 110, 130 can be configured to shunt power (e.g., energy) to a node other than ground (e.g., a non-ground node, a voltage bus ($V_{bus}$), a 5V bus, a 12V bus) to protect the load 140.

In some embodiments, one or more of the shunt devices 110, 130 can be any type of transient voltage suppressor (TVS) (also can be referred to as a transient voltage suppression device) such as a zener diode, a silicon-controlled rectifier (SCR) device, an active clamping device, a spark gap device, a polymer-based device, a varistor device, any other type of voltage breakdown and/or foldback device, and/or so forth. For example, the input shunt device 110 can be a zener diode configured to shunt current to ground when a voltage across the zener diode exceeds a trigger voltage (e.g., zener breakdown voltage) of the zener diode. Although illustrated as single devices in FIG. 1A, the shunt devices 110, 130 can each represent multiple devices (e.g., serially coupled devices, devices coupled in parallel) configured to provide power protection for the load 140. In some embodiments, the shunt devices 110, 130 can each be referred to as an overvoltage protection device. In some embodiments, one or more of the shunt devices 110, 130 can be.

The power management device 120 is configured to manage (e.g., trigger a balance, trigger a specified distribution) in power protection provided by the shunt devices 110, 130 because one or more characteristics of the shunt devices 110, 130 may not be matched in a desirable fashion. Specifically, the power management device 120 can be configured to trigger a balance in power protection provided by input shunt devices (i.e., internal shunt device 130) and output shunt devices (i.e., external shunt device 110), which may not have matching characteristics. For example, the input shunt device 110 may have a trigger voltage that is different from (e.g., greater than, less than) the trigger voltage of the output shunt device 130. Thus, the power management device 120 can be configured to trigger the input shunt device 110 and/or the output shunt device 130 to actively provide power protection despite the differences in trigger voltages. In other words, the power management device 120 can be configured to prevent, or mitigate turn-on/trigger race conditions between the shunt devices 110, 130.

As a specific example, if the power management device 120 were not coupled between the shunt devices 110, 130 and trigger voltage of the output shunt device 130 were less than the trigger voltage of the input shunt device 110, the input shunt device 110 may be prevented by the output shunt device 130 from providing power protection. In such instances, the output shunt device 130 may start shunting power away from the load 140 at the trigger voltage of the output shunt device 130 in response to an ESD event. The trigger of the output shunt device 130 at the trigger voltage of the output shunt device 130 may clamp (e.g., hold, maintain) the voltage across input shunt device 110 below the trigger voltage of the input shunt device 110. Accordingly, the input shunt device 110 may not (and could not) be activated (e.g., changed to a shunted state) and may not provide power protection. Thus, the input shunt device 110 may be rendered useless in this scenario.

In cases where the trigger voltage of the output shunt device 130 is less than the trigger voltage of the input shunt device 110, the power management device 120 can be configured to activate the input shunt device 110 after the output shunt device 130 has been activated. The power management device 120 can be configured to cause the voltage across the input shunt device 110 to exceed the higher trigger voltage of the input shunt device 110 even though the voltage across the output shunt device 130 is clamped at the lower trigger voltage of the output shunt device 130. Specifically, in some embodiments, after the output shunt device 130 is activated and may be clamped at the relatively low trigger voltage of the output shunt device 130, the power management device 120 can be configured to saturate and push a voltage across the input shunt device 110 beyond the trigger voltage of the input shunt device 110 so that the input shunt device 110 is activated. Thus, the power management device 120 can be configured to prevent (or substantially prevent) the output shunt device 130 versus input shunt device 110 trigger race condition, and can ensure that the input shunt device 110 will be activated to absorb ESD energy despite mismatches in trigger voltages of the input shunt device 110 and the output shunt device 130.

In some embodiments, the resistance across one or more of the shunt devices 110, 130, after being triggered (e.g., after starting to shunt current), can have an effect on the operation of the input power protection device 100. Specifically, when the shunt device triggers, it can pull current that causes its voltage to rise (in a resistive fashion). For example, in some embodiments, when the trigger voltage of the input shunt device 110 is less than the trigger voltage of the input shunt device 130, the input shunt device 110 with a lower trigger voltage, could, once triggered, have a voltage that rises up to a point where the voltage is high enough to trigger the output shunt device 130. In such instances, the output shunt device 130 can be activated (e.g., can turn-on), assist in clamping the voltage, but only to a current level allowed by the power management device 120. In this way, the power management device 120 and/or the output shunt device 130 can collectively operate to reduce at least some energy being absorbed by the input shunt device 110, even in the case where the input shunt device 110 has a lower trigger voltage than the output shunt device 130.

In cases where the trigger voltage of the output shunt device 130 (i.e., the trigger voltage of the internal shunt device) is greater than the trigger voltage of the input shunt device 110 (i.e., the trigger voltage of the external shunt device), the power management device 120 can be configured to passively permit (e.g., doesn't interfere with) the input shunt device 110 to activate before the output shunt device 130 has been activated. For example, in response to an ESD event, the input shunt device 110 may be activated at a first time when the trigger voltage of the input shunt device 110 has been exceeded. Also, in response to the same ESD event, the trigger voltage of the output shunt device 130 can be later activated at a second time (after the first time). The power management device 120 may be configured to passively permit this sequence of events to occur. In such embodiments, the power management device 120 can be configured to limit the amount of power shunted by the output shunt device 130.

In some embodiments, the power management device 120 can be configured to limit power through the output shunt device 130. For example, the power management device 120 can be configured to limit current through the output shunt device 130 after the output shunt device 130 has been activated (e.g., activated at the trigger voltage of the output shunt device 130) and is shunting current to ground. In some embodiments, by limiting current through the output shunt device 130, current may instead be redirected through the input shunt device 110 by the power management device 120. Accordingly, the power management device 120 may be configured to manage (e.g., balance) current redirected (e.g., absorbed) by the input shunt device 110 and by the output shunt device 130. In some embodiments, the power management device 120 can be configured to saturate so that current through the output shunt device 130 is limited. Thus, the power management device 120 is configured to manage energy sharing of an energy pulse (which can be an overvoltage transient) between the input shunt device 110 and the output shunt device 130—leading to a more robust input power protection device 100 than could be achieved by shunt devices (internal and/or external) without the power management device 120.

The external protection provided by the input shunt device 110 and the power management device 120 is advantageous especially in scenarios where the breakdown characteristics of an integrated circuit (e.g., load 140) coupled to, or including, the input power protection device 100 may not be known (or may have been independently designed). Specifically, the power management device 120 can be configured to trigger external shunt protection devices (e.g., external protection provided by the input shunt device 110) and/or limit power to the internal shunt protection devices (e.g., the output shunt device 130) even though the precise breakdown voltages of the integrated circuit and/or internal shunt protection devices may not be precisely known and/or may be unmatched with the external shunt protection devices. Thus, the output shunt device 130 can be configured with a power rating that is consistent with (e.g., limited by, limited by the saturation of) the power management device 120 independent of the power rating of the input shunt device 110, the power produced by the power source 150, potential power transients (e.g., ESD events), and/or so forth.

In some embodiments, the size (e.g., area, power capacity requirements) of the internal shunt device may be reduced (e.g., may be minimized) because energy associated with an energy pulse is at least partially absorbed by the input shunt device 110 (e.g., external shunt device). Specifically, the size of the output shunt device 130 (e.g., internal shunt device) may be reduced because the power management device 120 can limit energy absorbed by the output shunt device 130 and/or can distribute energy for absorption (and/or shunting) by the input shunt device 110. In some embodiments, a reduction in the size of the output shunt device 130 can result in space and/or cost savings for a circuit (e.g., a circuit board) including the output shunt device 130. In addition, parasitic capacitance associated with the output shunt device 130 may be reduced because the size of the output shunt device 130 may be smaller than would be possible without the power management device 120 and/or the input shunt device 110.

In some embodiments, the inclusion of the power management device 120 within the input power protection device 100, the input shunt device 110 (e.g., the external shunt device) can have a higher trigger voltage than would otherwise be possible. Specifically, the input shunt device 110 can have a relatively high trigger voltage because the power management device 120 is configured to trigger (e.g., trigger shunting) the input shunt device 110 even when the trigger voltage the input shunt device 110 is higher than the trigger voltage of the output shunt device 130. Without the inclusion of the power management device 120 the input shunt device 110 would not be activated unless the input shunt device 110 had a trigger voltage lower than the trigger voltage of the output shunt device 130. The power management device 120 can enable power protection by external shunt devices (e.g., the input shunt device 110) despite relatively low voltages for signaling through the input power protection device 100 and relatively low voltage (e.g., low trigger voltage) on-board protection by internal shunt devices (e.g., the output shunt device 130).

Because the input shunt device 110 can have a higher trigger voltage than the output shunt device 130, the input power protection device 100 can be further optimized for power handling and for maintaining signal integrity. For example, without the power management device 120 the input shunt device 110 may be required to have a relatively low trigger voltage compared with the trigger voltage of the output shunt device 130. Specifically, the input shunt device 110 may have a relatively low trigger voltage (e.g., a trigger voltage of approximately 5 V or less). Accordingly, the input shunt device 110 would have a relatively significant off-state leakage, an undesirable dynamic resistance, and a relatively high ground capacitance. With the power management device 120, the input shunt device 110 can be a relatively high trigger voltage device (when compared with the trigger voltage of the output shunt device 130) that has a relatively low off-state leakage, desirable dynamic resistance characteristics, and a relatively low ground capacitance. Also, because the input shunt device 110 can be a device with a relatively high trigger voltage, the input power protection device 100 can include various types of shunt devices such as ground voltage elevated SCR's.

Figure 1B:
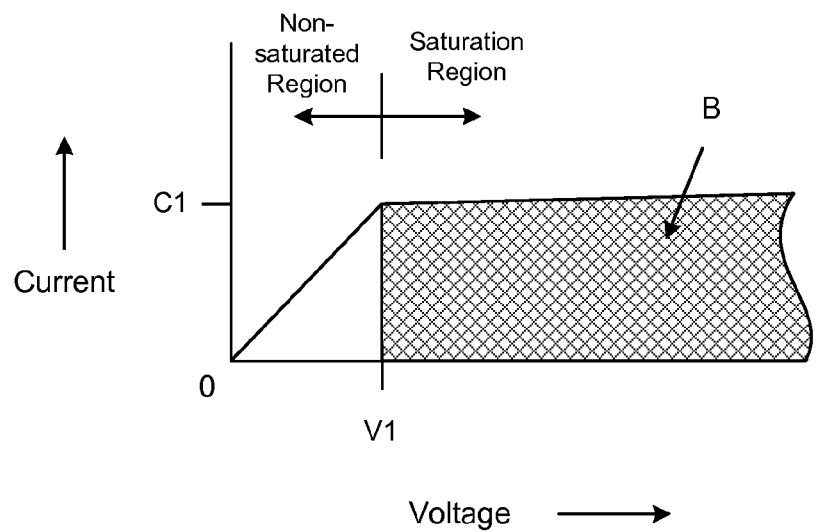
FIG. 1B is a graph that illustrates an example current-voltage (I-V) characteristic of the power management device shown in FIG. 1A.

FIG. 1B is a graph that illustrates an example current-voltage (I-V) characteristic of the power management device 120 shown in FIG. 1A. As shown in FIG. 1B, the current through the power management device 120 increases linearly (or approximately linearly) as the voltage across the power management device 120 increases. At approximately voltage V1 and current C1, the power management device 120 saturates and the current through the power management device 120 increases slightly (e.g., is relatively constant) (or may be constant) with increasing voltage beyond voltage V1. In some embodiments, the voltage V1 and the current C1 can be referred to as a saturation point. In some embodiments, the voltage V1 can be referred to as a saturation voltage, and the current C1 can be referred to as a saturation current. When the power management device 120 is operating beyond (to the right of) the saturation point, the power management device 120 can be referred to as operating in a saturation region, and when the power management device 120 is operating before (to the left of) the saturation point, the power management device 120 can be referred to as operating in a non-saturated region. In this embodiment, the non-saturated region can be referred to as a linear region. In some embodiments, the power management device 120 can be referred to as a non-linear power management device because the overall I-V characteristic of the power management device 120 is non-linear. Moreover, the slope of I-V characteristic of the power management device on one side of the saturation point is different than the slope of I-V characteristic of the power management device on the other side of the saturation point. Said differently, the rate of current increase with increasing voltage of the power management device on one side of the saturation point is different than the rate of current increase with increasing voltage of the power management device on the other side of the saturation point.

As shown in FIG. 1B, the power management device 120 can be configured to have a relatively low resistance (when in the non-saturated region) so that the power management device 120 may have a relatively small impact on the integrity of a signal through the input power protection device 100 (shown in FIG. 1A). The impact of the power management device 120 on signal integrity can be relatively small compared with the impact of the power management device 120 on the integrity of the signal of the power management device 120 with a higher resistance. In some embodiments, the resistance of the power management device 120, when operating at or near the saturation point, can be less than 0.2 ohms (e.g., a few milliohms, 0.1 ohms) in some applications. In some embodiments, the resistance of the power management device 120, when operating at or near the saturation point, can be approximately 0.2 ohms, or greater than 0.2 ohms (e.g., 0.8 ohms, 3 ohms, 5 ohms), in some applications.

Although not shown in FIG. 1B, in some embodiments, the current-voltage relationship of an power management device may not be linear when operating in the non-saturated region. For example, in some embodiments, current through the power management device may be relatively low when the voltage across the power management device is also relatively low. In such embodiments, the current through the power management device may increase exponentially as the voltage across the power management device approaches the voltage V1 (e.g., the saturation voltage). Thus, the power management device may effectively have a relatively high resistance until the voltage across the power management device approaches the voltage V1.

As another example, in some embodiments, current through the power management device may be relatively high when the voltage across the power management device is relatively low. In such embodiments the power management device may effectively have a relatively low resistance, and the current through the power management device may vary only slightly (or may be constant) when operating in the non-saturated region and the saturated region. Thus, the power management device can be configured to have a relatively low resistance (when in the non-saturated region) so that the power management device may have a relatively small impact on the integrity of a signal (e.g., may not attenuate a signal in an undesirable fashion).

Although not shown in FIG. 1B, in some embodiments, the current of an power management device may not increase slightly when operating in the saturated region. In some embodiments, the current through a power management device may be constant (or substantially constant) with increasing voltage when operating in the saturation region. In some embodiments, the current through a power management device may decrease slightly with increasing voltage when operating in the saturated region. In some embodiments, a power management device may be configured to reach a saturation point, but may have a current that falls below the current C1 when the voltage across the power management device is greater than V1. Thus, the power management device may operate within the shaded region B.

Figure 1C:
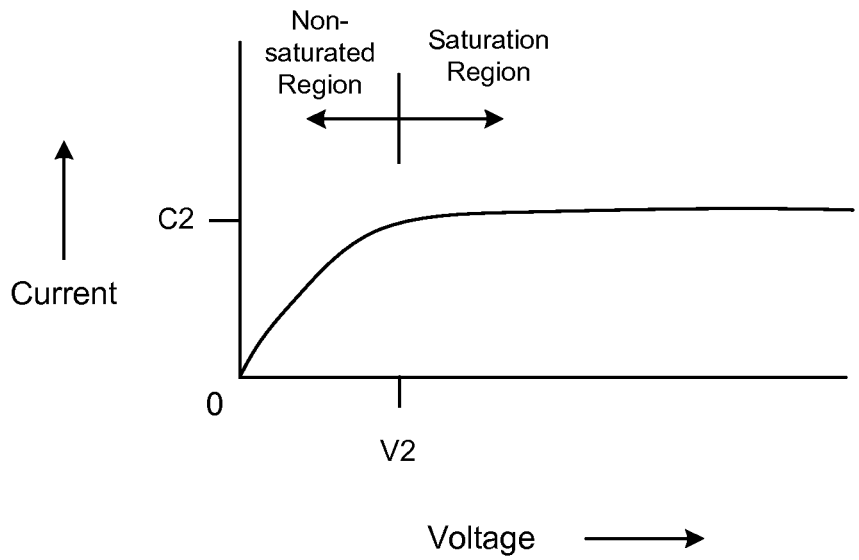
FIG. 1C is a graph that illustrates another example current-voltage (I-V) characteristic of a power management device such as the power management device shown in FIG. 1A.

FIG. 1C is a graph that illustrates another example current-voltage (I-V) characteristic of a power management device such as the power management device shown in FIG. 1A. As shown in FIG. 1C, the current through the power management device increases as the voltage across the power management device increases. At approximately voltage V2 and current C2, the power management device saturates and the current through the power management device increases slightly with increasing voltage beyond voltage V2.

Figure 1D:
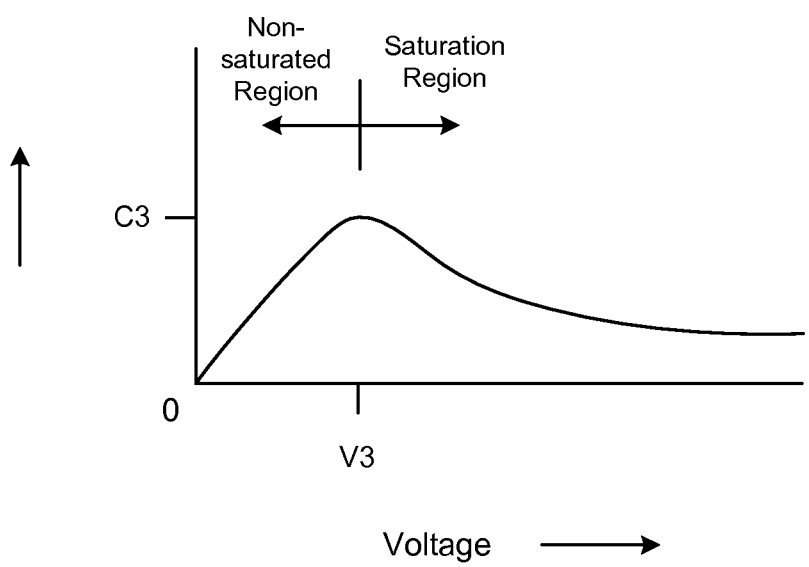
FIG. 1D is a graph that illustrates yet another example current-voltage (I-V) characteristic of a power management device such as the power management device shown in FIG. 1A.

FIG. 1D is a graph that illustrates yet another example current-voltage (I-V) characteristic of a power management device such as the power management device shown in FIG. 1A. As shown in FIG. 1D, the current through the power management device increases as the voltage across the power management device increases. At approximately voltage V3 and current C3, the power management device saturates (e.g., peaks) and then the current through the power management device decreases with increasing voltage beyond voltage V3. In some embodiments, the I-V characteristics of the power management device shown in FIG. 1D can be associated with a gallium arsenide (GaAs) semiconductor. Other materials (e.g., semiconductor materials) that exhibit similar properties (e.g., saturating semiconductor properties) that can be used in a power management device include AlxGal-xAs, GaxInl-xAs, GaN+zinc, GaN, InP, Ge, and so forth. Other types of materials that exhibit properties that can be used in a power management device include, for example, SiC, Si, 3C—SiC, and so forth.

Referring back to FIG. 1A, when the power management device 120 has a current voltage characteristics similar to the current voltage characteristics shown in FIG. 1B, the power management device 120 can limit current through the output shunt device 130 and trigger the input shunt device 110 to actively provide power protection even in embodiments where the trigger voltage of the input shunt device 110 is higher than a trigger voltage of the output shunt device 130. For example, when the power management device 120 is operating in the saturation region shown in FIG. 1B (in response to an ESD event), current through the downstream output shunt device 130 will at least be limited to (or approximately limited to) the current C1. Also, when the power management device 120 is operating in the saturation region shown in FIG. 1B, the voltage across the power management device 120 may cause the voltage across the input shunt device 110 to increase until the trigger voltage of the input shunt device 110 is exceeded with a relatively small increase in current (from an ESD event) through the power management device 120.

In some embodiments, one or more reactive components can be included in the input power protection device 100 to offset (e.g., cancel) the impact of one or more parasitic effects associated with one or more components of the input power protection device 100. For example, an inductive component can be coupled in series with the power management device 120 to offset the undesirable effects (e.g., signal degradation, signal noise) of a capacitive component of one or more of the shunt devices 110, 130. More details related to reactive components included in an input power protection device are discussed in connection with FIG. 9.

In some embodiments, when the input shunt device 110 is activated, the input shunt device 110 can be configured to provide power protection to the power management device 120. In other words, the input shunt device 110 can be configured to shunt power away from the power management device 120. In some embodiments, the input shunt device 110 can be configured so that the input shunt device 110 is activated before the power management device 120 is damaged and/or fails. Specifically, the input shunt device 110 can be configured so that the input shunt device 110 is activated before a threshold failure voltage (over a specified period of time) and/or a threshold failure current level (over a specified period of time) of the power management device 120 is achieved.

Although not shown in FIG. 1A, in some embodiments, more than one input shunt device may be included in the input power protection device 100 on the input side of the power management device 120. Similarly, in some embodiments, more than one output shunt device may be included in the input power protection device 100 on the output side of the power management device 120. Also, the input shunt device 110 and/or the power management device 120 can be included in the internal portion 20 of the input power protection device 100. In such instances, the input power protection device 100 may not have an external portion 10. Similarly, the output shunt device 130 can be included in the external portion 10 of the input power protection device 100. In such instances, the input power protection device 100 may not have an internal portion 20.

As shown in FIG. 1A, the input power protection device 100, the power source 150, and the load 140 can be included in (e.g., integrated into) a computing device (not shown). In some embodiments, the computing device 10 can be, for example, a computer, a personal digital assistant (PDA), a memory component (e.g., a hard disk drive), a host computer, an electronic measurement device, a data analysis device, a cell phone, an electronic device, and/or so forth.

In some embodiments, the power source 150 can be any type of power source such as, for example, a switched mode power supply, a direct-current (DC) power supply, an alternating-current (AC) power supply, and/or so forth. In some embodiments, the power source 150 can include a power source that can be any type of power source such as, for example, a direct current (DC) power source such as a battery, a fuel cell, and/or so forth.

In some embodiments, the power source 150 can be a signal sources such as a transmitter configured to transmit one or more signals (e.g., data signals). In some embodiments, the power source 150 can be coupled via a wire, or wirelessly coupled to the input power protection device 100. In such embodiments, one or more portions of the input power protection device 100 can be included in a transceiver configured to receive one or more signals from the power source 150.

Figure 2:
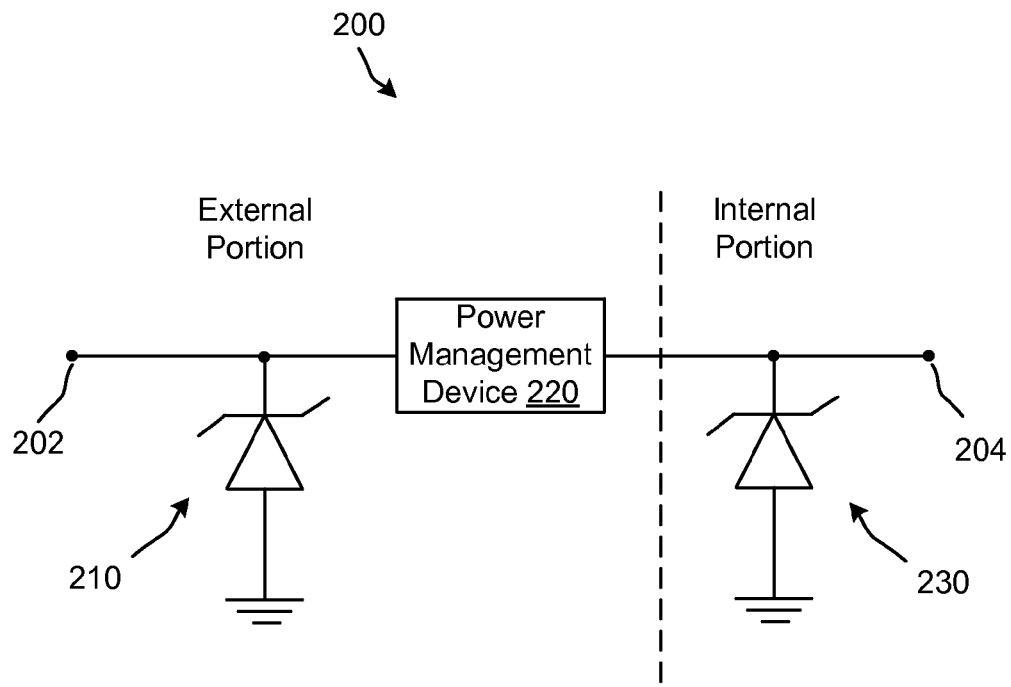
FIG. 2 is a diagram that illustrates a power management device included in an input power protection device.

FIG. 2 is a diagram that illustrates a power management device 220 included in an input power protection device 200. As shown in FIG. 2, the power management device 220 is serially coupled between an input zener diode 210 and an output zener diode 230. The input zener diode 210 is coupled to an input terminal 202 of the input power protection device 200, which can be configured to be coupled to a power source (not shown). The output zener diode 230 is coupled to an output terminal 204 of the input power protection device 200, which can be configured to be coupled to a load (not shown). In this embodiment, the input zener diode 210, the power management device 220, and the output zener diode 230 collectively function as the input power protection device 200. The input zener diode 210 and the output zener diode 230 function as shunt devices configured to shunt energy to a ground node (e.g., a ground terminal).

As shown in FIG. 2, the power management device 220 and the input zener diode 210 are included in an external portion of the input power protection device 200, and the output zener diode 230 is included in an internal portion of the input power protection device 200. In some embodiments, the input zener diode 210 and the output zener diode 230 can have different trigger voltages. Accordingly, the power management device 220 can be configured to manage power protection provided by the input zener diode 210 and the output zener diode 230.

In some embodiments, the zener diodes 210, 230 can each include a silicon substrate that includes (or is associated with) at least a portion of a PN junction. In some embodiments, the PN junction can be produced in a single or multiple crystals of semiconductor, for example, by doping, using ion implantation, diffusion of dopants, epitaxial growth, and/or so forth. Although this embodiment, and many of the embodiments described herein, are discussed in the context of a zener diode, any type of shunt device (e.g., overvoltage protection portion) may be used with, or instead of, the zener diode. For example, each of the zener diodes 210, 230 of the input power protection device 200 could be any type of TVS device in some embodiments.

Figure 3:
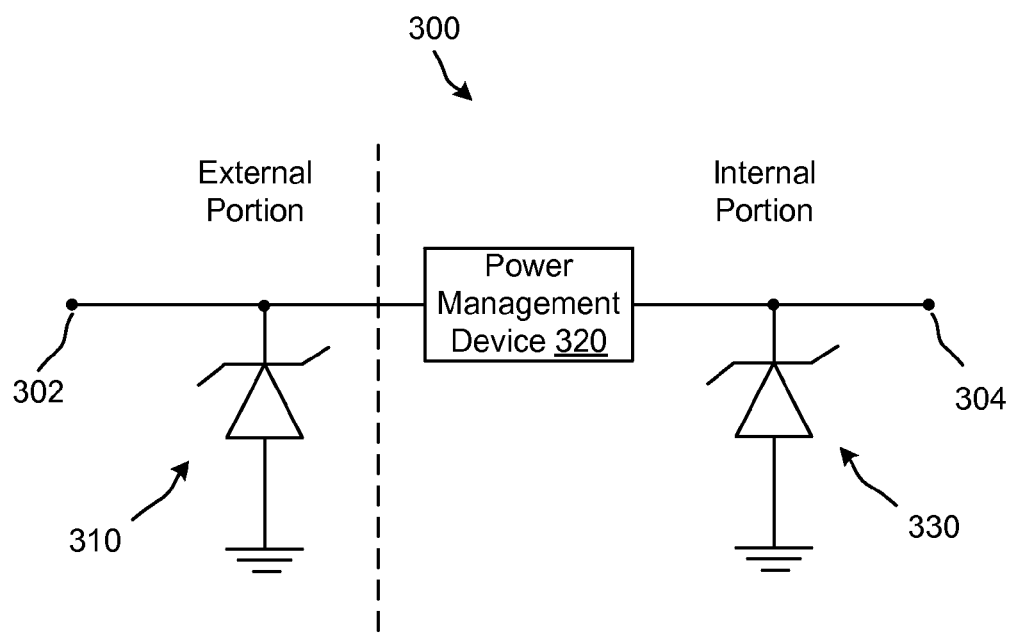
FIG. 3 is a diagram that illustrates a power management device included in another input power protection device.

FIG. 3 is a diagram that illustrates another power management device 320 included in an input power protection device 300. As shown in FIG. 3, the power management device 320 is serially coupled between an input zener diode 310 and an output zener diode 330. The input zener diode 310 is coupled to an input terminal 302 of the input power protection device 300, which can be configured to be coupled to a power source (not shown). The output zener diode 330 is coupled to an output terminal 304 of the input power protection device 300, which can be configured to be coupled to a load (not shown). In this embodiment, the input zener diode 310, the power management device 320, and the output zener diode 330 collectively function as the input power protection device 300. The input zener diode 310 and the output zener diode 330 function as shunt devices configured to shunt energy to a ground node (e.g., a ground terminal).

As shown in FIG. 3, the power management device 320 and the output zener diode 330 are included in an internal portion of the input power protection device 300, and the input zener diode 310 is included in an external portion of the input power protection device 300. In some embodiments, the input zener diode 310 and the output zener diode 330 can have different trigger voltages. Accordingly, the power management device 320 can be configured to manage power protection provided by the input zener diode 310 and the output zener diode 330. In some embodiments, the power management device 320 and the output zener diode 330 can be collectively configured so that the output zener diode 330 can be optimized for the maximum output current of the power management device 320 (when the power management device 320 is operating in a saturated state). For example, the output zener diode 330 can be configured with a relatively small size, a relatively high trigger voltage to decrease capacitance, and/or so forth.

FIGS. 4A through 4E are graphs that collectively illustrate operation of an input power protection device such as the input power protection devices described herein (e.g., input power protection device 100 shown in FIG. 1A). Although the behavior of the components described in connection with FIGS. 4A through 4E are described as, for example, making transitions at specified voltages, currents, and/or at specified times, when implemented (e.g., implemented using semiconductor devices), the transitions of the components may occur slightly before or slightly after the specified voltages, currents, and/or specified times. Specifically, variations in trigger voltages, thermal conductivity, processing variations, temperature variations, upstream resistance, switching times of devices, circuit transition delays, and/or so forth can result in conditions (e.g., non-ideal conditions) that can trigger transitions of components slightly before or slightly after the voltages, currents, and/or times shown in FIGS. 4A through 4E. As shown in FIGS. 4B through 4E, time is increasing to the right. In some embodiments, the sequence of events associated with FIGS. 4B through 4E can occur during a relatively short period of time (e.g., within a few nanoseconds).

Figure 4A:
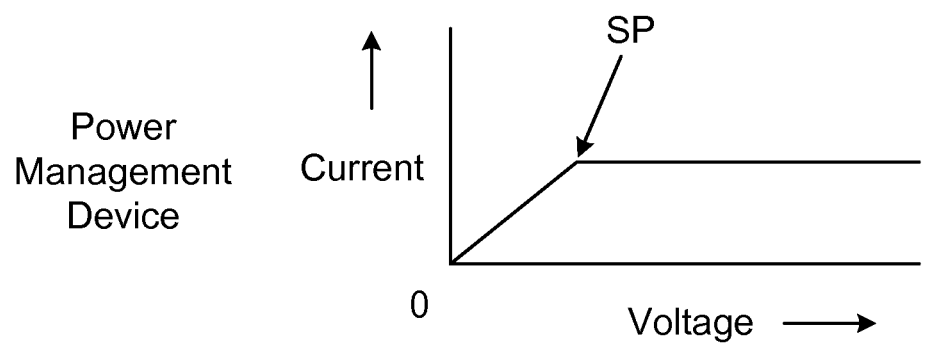
FIG. 4A is a graph that illustrates a current-voltage (I-V) characteristic of a power management device disposed between an external shunt device and an internal shunt device.
Figure 4E:
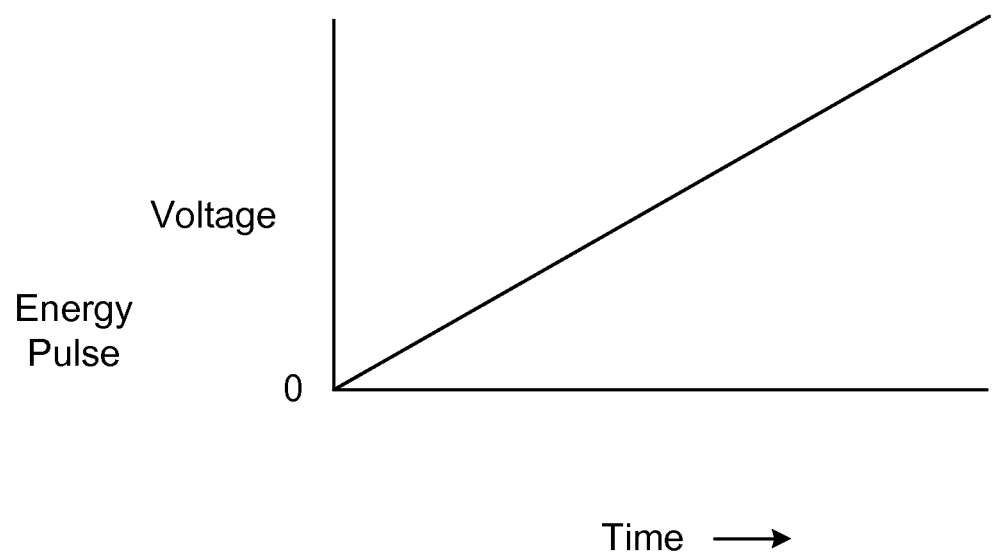
FIG. 4E is a graph that illustrates an example of an energy pulse.
Figure 4B:
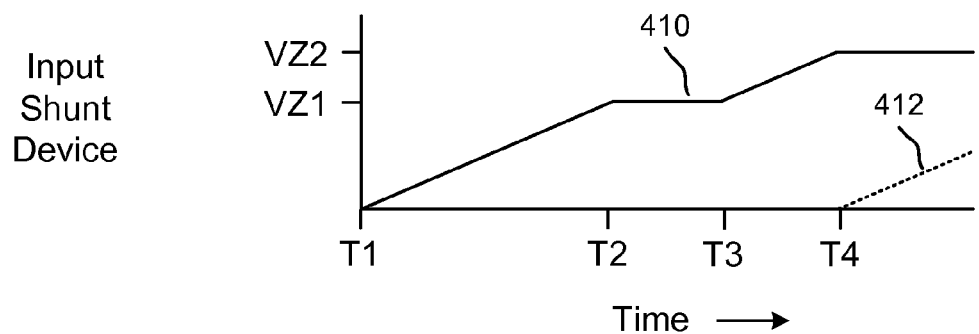
FIG. 4B is a graph that illustrates the behavior of the external shunt device discussed in connection with FIG. 4A.
Figure 4C:
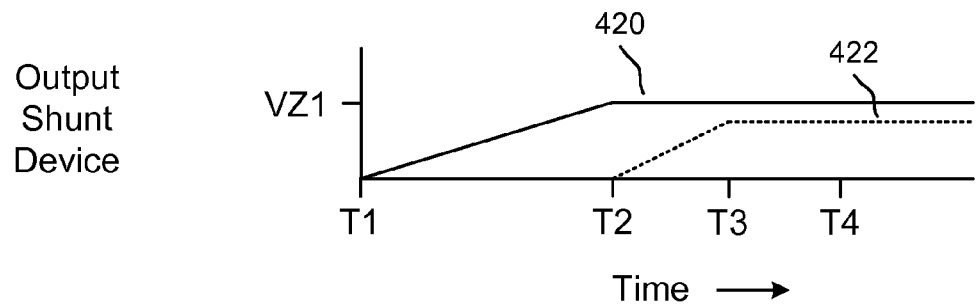
FIG. 4C is a graph that illustrates the behavior of the internal shunt device discussed in connection with FIG. 4A.
Figure 4D:
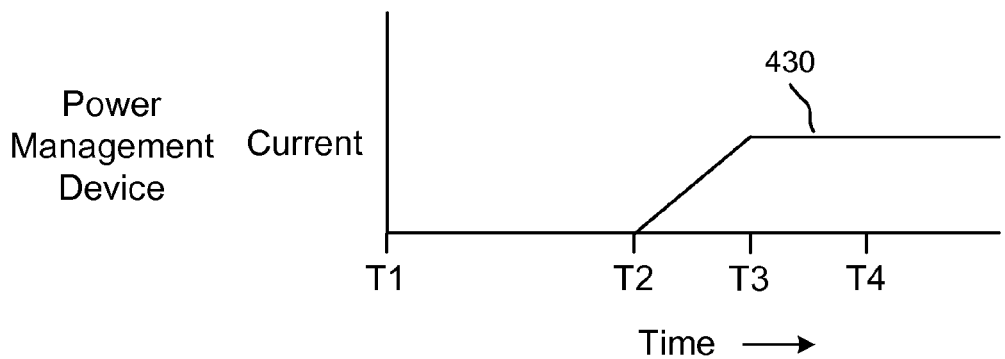
FIG. 4D is a graph that illustrates the behavior of the power management device discussed in connection with FIG. 4A.

FIG. 4A is a graph that illustrates a current-voltage (I-V) characteristic of an power management device disposed between an input shunt device and an output shunt device. The power management device can correspond with the power management device 120 shown in FIG. 1A, and the input and output shunt devices can correspond with the input shunt device 110 and the output shunt device 130, respectively, shown in FIG. 1A. FIGS. 4B through 4D are graphs that illustrates the behavior of the power management device, the input shunt device, and the output shunt device in response to a rising energy pulse.

Specifically, FIG. 4B is a graph that illustrates the behavior of the input shunt device, FIG. 4C is a graph that illustrates the behavior of the output shunt device, and FIG. 4D is a graph that illustrates the behavior of the power management device. A voltage 410 (which is represented with a solid line) across the input shunt device and a current 412 through the input shunt device are shown in FIG. 4B (which is represented with a dashed line). Similarly, a voltage 420 (which is represented with a solid line) across the output shunt device and a current 422 through the output shunt device are shown in FIG. 4C (which is represented with a dashed line). In this embodiment, the output shunt device has a trigger voltage VZ1 that is lower than a trigger voltage VZ2 of the input shunt device. A current 430 through the power management device is illustrated in FIG. 4D. In this embodiment, the curves in FIGS. 4B through 4D assume no load resistance to ground. In other words, these curves assume that the voltage does not generate current until the shunt devices are activated (e.g., are activated). FIG. 4E is a graph that illustrates an example of an energy pulse.

As shown in FIG. 4A, which illustrates the I-V characteristic of the power management device, the current through the power management device increases linearly as the voltage across the power management device increases. At approximately the saturation point SP (which occurs at a specified current and voltage), the power management device saturates and the current through the power management device is approximately constant with increasing voltage beyond the saturation point SP. When the power management device is operating beyond the saturation point SP, the power management device can be referred to as operating in a saturation region and when the power management device is operating before the saturation point, the power management device can be referred to as operating in a non-saturated region.

The voltage 410 across the input shunt device (shown in FIG. 4B) and the voltage 420 across the output shunt device (shown in FIG. 4C) increase in response to the energy pulse starting at time T1. In some embodiments, the voltage 410 across the input shunt device in the voltage 420 across the output shunt device can differ by a voltage drop across the power management device. In this embodiment, the voltage across the power management device is not shown. The voltage 410 across the input shunt device and the voltage 420 across the output shunt device increase until the trigger voltage VZ1 of the output shunt device exceeded at approximately time T2.

As shown in FIG. 4C, at time T2 the voltage 420 across the output shunt device is limited to (e.g., approximately limited to, clamped to) the trigger voltage VZ1 of the output shunt device. Because the voltage 420 across the output shunt device is limited to the trigger voltage VZ1, the voltage 410 across the input shunt device is also limited starting at time T2 as shown in FIG. 4B. In other words, the clamping of the voltage 420 across the output shunt device results in the clamping of the voltage 410 across the input shunt device. The voltage 410 across the input shunt device is shown as being relatively flat between times T2 and T3, but, in some embodiments, the voltage 410 across the input shunt device between times T2 and T3 may have some slope (or non-linearity) due to the resistance across the power management device generating a relatively small voltage drop as the current through the power management device increases. Also, as shown in FIG. 4C, current 422 starts to flow through the output shunt device because, at the trigger voltage VZ1 of the output shunt device, the output shunt device is activated and starts to shunt current.

As shown in FIG. 4D, in response to the output shunt device shunting current starting at approximately time T2, current 430 is drawn through (e.g., generated through) the power management device starting at time T2. In some embodiments, the current through the power management device can be referred to as being drawn by (or in response to) the output shunt device being triggered. Assuming no load, the current 430 through the power management device is the same as the current through the output shunt device (shown in FIG. 4C). In some embodiments, if a load were coupled to the input power protection device at least a portion of the current 430 through the power management device may be shunted through the output shunt device and another portion of the current 430 may be provided to the load.

As shown in FIG. 4D, at approximately time T3, the power management device saturates and the current 430 through the power management device is limited to (e.g., approximately limited to) a saturation current. The power management device saturates at the saturation point SP along the I-V curve shown in FIG. 4A. Because the current through the power management device is limited to the saturation current, the current 422 through the output shunt device is also limited starting at time T3 (as shown in FIG. 4C). Thus, the current 422 through the output shunt device is limited by the current 430 through the saturated power management device shown in FIG. 4D.

As shown in FIG. 4B, the voltage 410 across the input shunt device begins to increase at approximately time T3 in response to the power management device reaching the saturation point SP. The voltage 410 across the input shunt device increases as the voltage across the power management device increases in response to the steady-state rising energy pulse. Specifically, the voltage of the power management device continues to increase in accordance with the I-V curve shown in FIG. 4A even though the current through the power management device has saturated. The increase in voltage across the power management device results in the rising voltage 410 of the input shunt device starting at time T3.

The voltage 410 across the input shunt device increases until, at time T4, the trigger voltage VZ2 of the input shunt device is reached, and the input shunt device is activated and starts to shunt current. Specifically, at that time T4, the voltage 410 across the input shunt device is clamped at the trigger voltage VZ2 and current 412 starts to flow through the output shunt device because the output shunt device is activated at the trigger voltage VZ2. Thus, the input shunt device is configured to start shunting the current 412 in response to a combination of a voltage (not shown) across the power management device and the voltage 420 across the output shunt device exceeding the trigger voltage VZ2 of the input shunt device.

In some embodiments the current 412 through the input shunt device may initially be smaller than the current 422 through the output shunt device, but can increase until the current 412 is larger than the current 422 through the output shunt device. In some embodiments, the current 412 through the input shunt device may be settle at a level equal to or remain at a level below the current 422 through the output shunt device, and/or the current 412 through the input shunt device may fluctuate. In some embodiments, the current 412 and the current 422 may be portions (i.e., a first portion and a second portion) of a current into the input power protection device.

FIG. 4E is a graph that illustrates an energy pulse, according to an embodiment. In some embodiments, the energy pulse can be a rising voltage through a resistor to ground.

Figure 5:
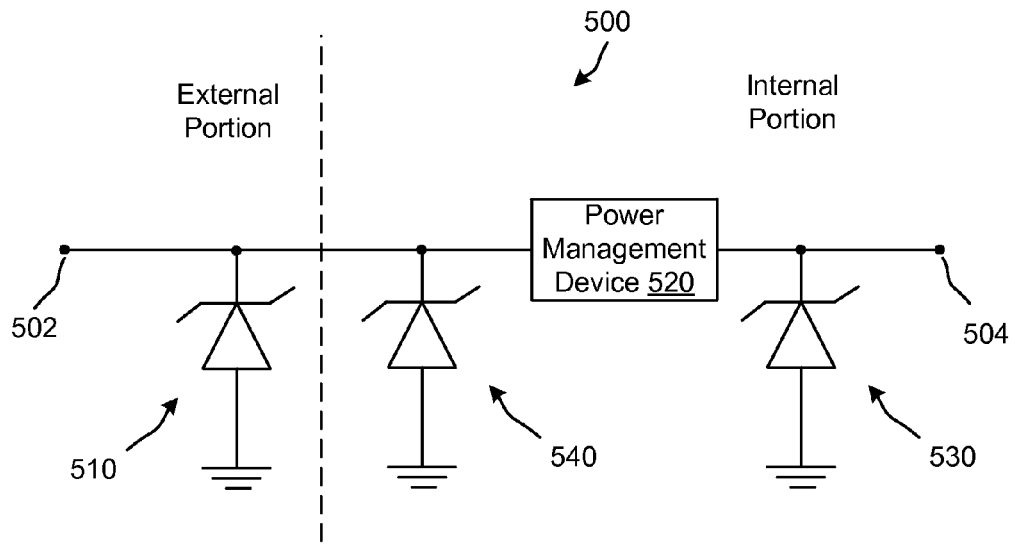
FIG. 5 is a diagram that illustrates a power management device included in yet another input power protection device.

FIG. 5 is a diagram that illustrates a power management device 520 included in yet another input power protection device 500. As shown in FIG. 5, the power management device 520 is serially coupled between an output zener diode 530 and an input zener diode 540. An input zener diode 510 is coupled in parallel to the input zener diode 540. In this embodiment, the input zener diode 510 is coupled to an input terminal 502 of the input power protection device 500, which can be configured to be coupled to a power source (not shown). The output zener diode 530 is coupled to an output terminal 504 of the input power protection device 500, which can be configured to be coupled to a load (not shown). In this embodiment, the input zener diode 510, the power management device 520, and the output zener diode 530 collectively function as the input power protection device 500. The input zener diode 510 and the output zener diode 530 function as shunt devices configured to shunt energy to a ground node (e.g., a ground terminal). As shown in FIG. 5, the power management device 520, the output zener diode 530, and the input zener diode 540 are included in an internal portion of the input power protection device 500, and the input zener diode 510 is included in an external portion of the input power protection device 500.

In this embodiment, the input zener diode 540 can be configured with a trigger voltage that is higher than a trigger voltage of the input zener diode 510 and higher than a trigger voltage of the output zener diode 530. The input zener diode 540 can be configured with a higher trigger voltage than both the input zener diode 510 and the output zener diode 530 so that the input zener diode 540 may only be activated in response to a relatively large (e.g., high voltage, high current) energy pulse (compared with an energy pulse that may activate the input zener diode 510 and/or the input zener diode 540).

In some embodiments, the input zener diode 540 can be configured to be activated in a fault event prior to, for example, installation of a circuit board in a computing device and coupling of the internal portion of the input power protection device 500 to the external portion of the input power protection device 500. In other words, the input zener diode 540 may potentially be activated until the internal portion of the input power protection device 500 is coupled to (e.g., coupled to during a manufacturing, installation, and/or assembly process) the external portion of the input power protection device 500. Thus, the input zener diode 540 can be configured to function as a temporary input power protection device until (e.g., before) the internal portion of the input power protection device 500 is coupled to the external portion of the input power protection device 500. In such embodiments, the input zener diode 540 can have a trigger voltage that is higher than a trigger voltage of the input zener diode 510 and higher than a trigger voltage of the output zener diode 530. In some embodiments, the input zener diode 540 can be referred to as a temporary zener diode (or temporary shunt device). In some embodiments, any type of active shunt device and/or an SCR device can be used in conjunction with, or in lieu of, the input zener diode 540.

After the internal portion of the input power protection device 500 is coupled to the external portion of the input power protection device 500, the input zener diode 510 and the output zener diode 530 (which have relatively low trigger voltages) will be activated before the input zener diode 540 (which has a relatively high trigger voltage). Thus, after the coupling of the internal portion to the external portion, the input zener diode 540 may not have the opportunity to be activated (because the input zener diode 510 will be activated prior to the input zener diode 540 being activated). In some embodiments, without this temporary protection provided by the input zener diode 540 before coupling of the external to the internal portion, ESD pulses may be limited to the saturation current and breakdown voltage of the power management device 520 (assuming ESD pulse currents exceed the saturation point of the power management device 520), and exceeding these levels could damage the power management device 520 (in the absence of the input zener diode 540).

In some embodiments, the input zener diode 540 may be configured with a relatively high trigger voltage and a relatively low capacitance so that the input zener diode 540 may pass a relatively small energy pulse (e.g., ESD pulse) to be absorbed by the input power protection device 500. In other words, the input zener diode 540 may be configured with a relatively high trigger voltage and a relatively low capacitance so that only relatively large energy pulses trigger (e.g., trigger shunting) the input zener diode 540. In some embodiments, the input zener diode 540 can be configured with a relatively high trigger voltage and a relatively low capacitance so that the input zener diode 540 will pass relatively small energy pulses until the input zener diode 540 (which is associated with the internal portion) is coupled to the input zener diode 510 (which is associated with the external portion). After the input zener diode 540 is coupled to the input zener diode 510, the input zener diode 510 may provide power protection that dominates over (e.g., that is activated before) the input zener diode 540. In some embodiments, the configuration shown in FIG. 5 can allow for an on-board design that has lower capacitance than would otherwise be possible.

Although not shown in FIG. 5, in some embodiments, the input zener diode 540 can instead be configured as a shunt device that bypasses the power management device 520. In other words, in some embodiments, rather than including a shunt to ground (i.e., the input zener diode 540), the internal portion of the input power protection device 500 can include a shunt device that bypasses the power management device 520.

Although not shown in FIG. 5, in some embodiments, an additional power management device (in additional to power management device 520) can be disposed between the zener diode 510 and the zener diode 540. In such embodiments, the additional power management device can be configured to trigger shunting of power through the zener diode 510 in scenarios where the zener diode 540 has a lower trigger voltage than a trigger voltage of the zener diode 510. In such embodiments, the additional zener diode may be included in the external portion or in the internal portion.

Figure 6:
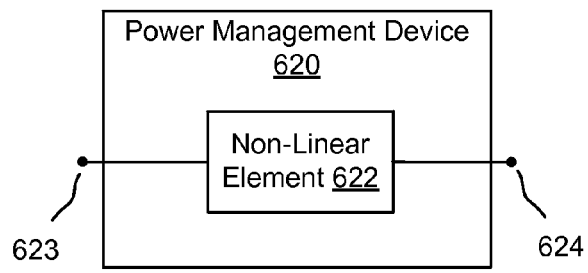
FIG. 6 is a diagram that illustrates a power management device, according to an embodiment.

FIG. 6 is a diagram that illustrates a power management device 620, according to an embodiment. As shown in FIG. 6, the power management device 620 includes a non-linear element 622, an input terminal 623, and an output terminal 624. In some embodiments, the non-linear element 622 can include one or more semiconductor portions produced using one or more semiconductor processing techniques. In some embodiments, the non-linear element 622 can include one or more transistors (or portions thereof), one or more logic portions, and/or so forth. In some embodiments, the power management device 620 can be a single-transistor device. In some embodiments, the non-linear element 622 can be, or can include, a portion of a gallium arsenide (GaAs) semiconductor (and/or other type of semiconductor material) and/or can include, for example, a transistor device made from a GaAs semiconductor (and/or other type of semiconductor material). In some embodiments, a shunt device (e.g., a zener diode) coupled to the input terminal 623 can be referred to as an input shunt device, and a shunt device (e.g., a zener diode) coupled to the output terminal 624 can be referred to as an output shunt device. In some embodiments, the non-linear element 622 can be a passive element with non-linear conduction properties. In some embodiments, other elements (e.g., inductors, capacitors, resistors, etc.) can be integrated into the power management device 620 with the non-liner element 622 or into the non-liner element 622. In some embodiments, other elements (e.g., input shunt device, output shunt device) can be integrated with the power management device 620 into an input power protection device (as a standalone (or single) discrete component).

Figure 7:
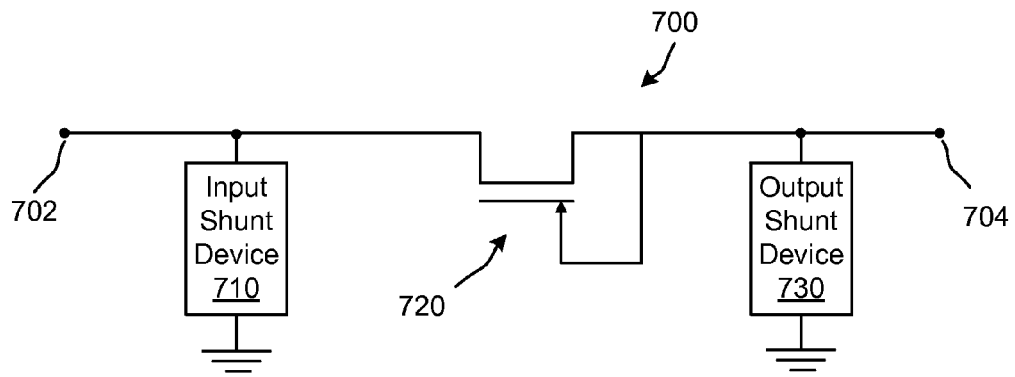
FIG. 7 is a diagram that illustrates an input power protection device that includes a junction field effect (JFET) as a power management device.

FIG. 7 is a diagram that illustrates an input power protection device 700 that includes a junction field effect (JFET) device 720 as a power management device. As shown in FIG. 7, the JFET device 720 is serially coupled between a shunt device 710 and a shunt device 730. In some embodiments, the gate of the JFET device 720 can be tied to the source of the JFET device 720. The JFET device 720 can have an I-V characteristic similar to that shown in, for example, FIG. 1B. In this embodiment, the shunt device 710 is coupled to an input terminal 702 of the input power protection device 700, which can be configured to be coupled to a power source (not shown). The shunt device 730 is coupled to an output terminal 704 of the input power protection device 700, which can be configured to be coupled to a load (not shown). In this embodiment, the shunt device 710, the JFET device 720, and the shunt device 730 collectively function as the input power protection device 700. The shunt device 710 and the shunt device 730 function as shunt devices configured to shunt energy to a ground node (e.g., a ground terminal). In some embodiments, the JFET device 720 and/or the shunt device 730 can be included in an internal portion of the input power protection device 700, and the shunt device 710 can be included in an external portion of the input power protection device 700.

Although FIG. 7 is illustrated with a JFET device 720, any type of saturating device (e.g., current saturating device) can be used in conjunction with, or in lieu of, the JFET device 720. In some embodiments, the JFET device 720 can be a JFET-like device with modified features while maintaining current saturating characteristics. For example, a diode connected transistor device that is configured to saturate can be used instead of the JFET device 720. In some embodiments, a bipolar transistor structure, a silicon trench field-effect-transistor, structural variations of said devices, and/or so forth can be configured for use as a power management device within the input power protection device 700.

Figure 8:
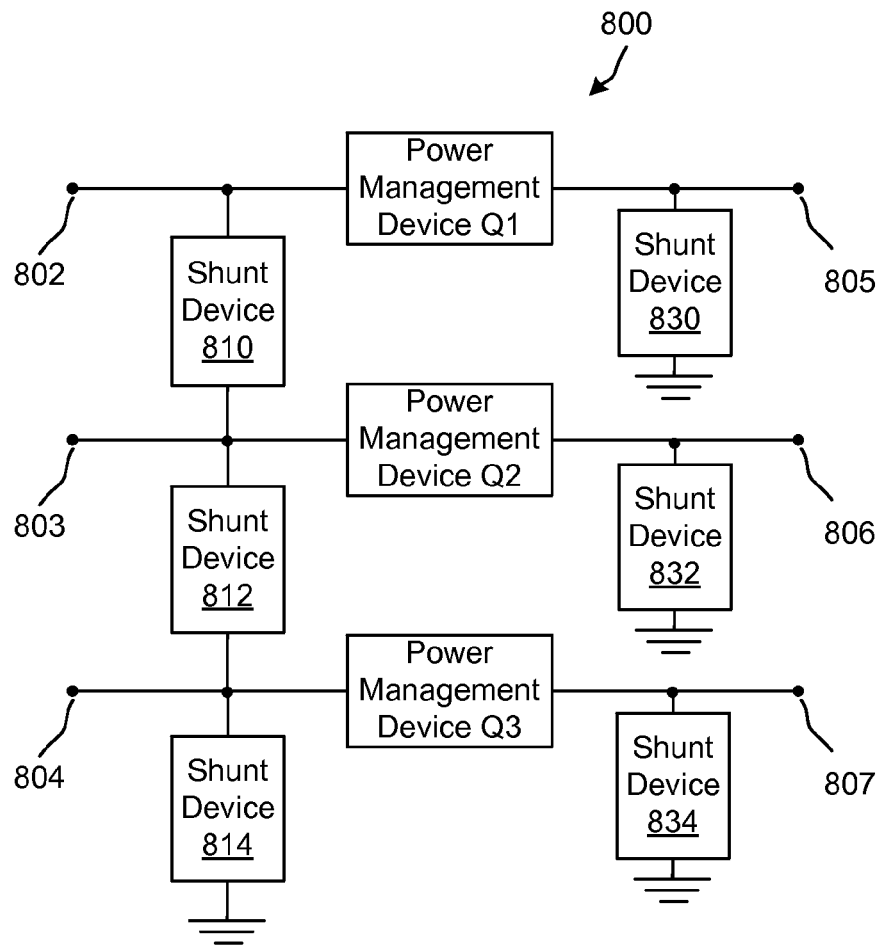
FIG. 8 is a diagram that illustrates multiple power management devices included in an input power protection device configured to provide input power protection.

FIG. 8 is a diagram that illustrates multiple power management devices included in an input power protection device 800 configured to provide input power protection. As shown in FIG. 8, the input power protection device 800 includes power management devices Q1 through Q3, input shunt devices 810 through 814, an output shunt devices 830 through 834. In this embodiment, input power protection device 800 includes input terminals 802 through 804, and includes output terminals 805 through 807. The output shunt devices 830 through 834 of each are coupled to a ground (e.g., a ground node) and are configured to shunt to ground. In contrast, the shunt devices 810 through 814 are serially coupled such that power is shunted through the shunt device 814 to ground. As shown in FIG. 8, input shunt device 810 and 812 are referenced to non-ground nodes. Various advantages, including size reductions, can be achieved through this type of architecture.

In the architecture shown in FIG. 8, energy associated with an energy pulse (e.g., an ESD pulse) into any of the input terminals 802 through 804 may be dissipated via the multiple shunt devices. Thus, the energy stress from the energy pulse on each of the input terminals 802 through 804 may potentially be reduced. The total voltage and current amplitude associated with the energy pulse may be dropped accordingly. The architecture of input power protection device 800 shown in FIG. 8 can result in a size (e.g., area, power handling capacity) reduction of each of the shunt devices 810 through 814 and shunt devices 830 through 834 without compromising the total power handling capability of the input power protection device 800. This can, in turn, assist in reduction of line-to-line and line-to-ground parasitic capacitance, device size requirements, and/or leakage currents.

As a specific example, energy associated with a 12 A energy pulse can be received on any of the input terminals 802 through 804. If each of the output shunt devices 805 through 807 are configured to shunt 2 A of current from the 12 A energy pulse, the input shunt device 810 will shunt 10 A of current (because 2 A will be shunted by output shunt device 830), the input shunt device 812 will shunt 8 A of current (because 4 A total will be shunted by output shunt devices 830, 832), and the input shunt device 814 will shunt 6 A (because 6 A total will be shunted by output shunt devices 830 through 834). This example illustrates that none of the shunt devices (input or output) need to handle the full current 12 A associated with the energy pulse. This example also illustrates that the energy pulse is distributed through all of the devices within the input power protection device 800. In some embodiments, the shunt device 814 can be sized smaller than the shunt device 812, and the shunt device 812 can be sized smaller than the shunt device 810. In some embodiments, the output shunt devices 830 through 834 can be sized smaller than all of the input shunt devices 810 through 814.

Figure 9:
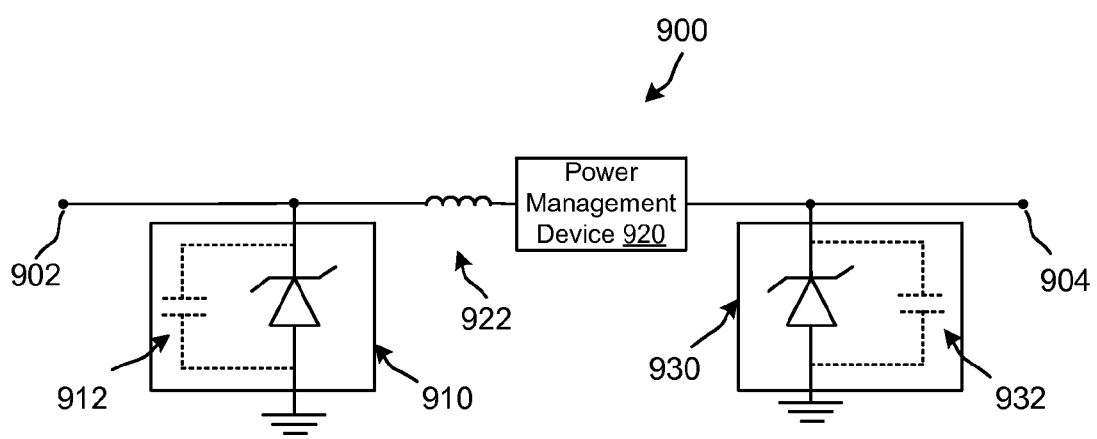
FIG. 9 is a diagram that illustrates a tuning inductance included in an input power protection device.

FIG. 9 is a diagram that illustrates a tuning inductance 922 included in an input power protection device 900. Specifically, the tuning inductance 922 is a series inductance. As shown in FIG. 9, a detuning capacitance 912 inherent in an input shunt device 910 is shown with a dashed line and is modeled as a capacitor, and a detuning capacitance 932 inherent in an output shunt device 930 is also shown with a dashed line and is modeled as a capacitor.

In this embodiment, the tuning inductance 922 is included (e.g., is integrated into) in the input power protection device 900 to offset effects (e.g., undesirable line impendence, signal distortion caused by capacitance) from the detuning capacitance 912 and/or the detuning capacitance 932, which are respectively inherent in the input shunt device 910 and the output shunt device 930. The tuning inductance 922 can be integrated into the power management device 920, or a portion thereof (e.g., a non-linear element of the power management device 920) (as a standalone (e.g., single) discrete component). In some embodiments, the input power protection device 900 (including the tuning inductance 922) can be integrated as a standalone, discrete component. In some embodiments, the tuning inductance 922 can be part of the material properties of at least a portion of, for example, the power management device 920 (or portion thereof).

In some embodiments, the tuning inductance 922 can be part of the physical device construction of the power management device 920 including relatively long wire bonds for making internal connections, part of the physical device implementation, and so forth. In some embodiments, for example, installing of the input power protection device 900, or a portion thereof (e.g., power management device 920, non-linear element), can be configured so that a signal through the input power protection device 900 can be physically raised away from a ground plane under the input power protection device 900 (or portion thereof) to generate (e.g., create) a reactive inductance (represented by tuning inductance 922).

The in-line (e.g., serially coupled) tuning inductance 922 can be configured to provide compensating reactance for the detuning capacitances 912, 932. With compensation, the shunt devices (i.e., the shunt devices 910, 930) included in the input power protection device 900 can have higher capacitances (and can be larger power absorbing devices) than would otherwise be possible without the tuning inductance 922. In some embodiments, the tuning inductance 922 can be included in the input power protection device so that the impact of the detuning capacitances 912, 932 may be below a threshold value (e.g., a threshold line impendence value). In other words, the tuning inductance 922 can be included in the input power protection device 900 to improve general line signal integrity (e.g., decrease signal attenuation) that can be associated with an input signal through the input power protection device 900. In some embodiments, multiple tuning inductances can be included in the input power protection device 900 (coupled to the input or output of the power management device 920).

Although the tuning inductance 922 is a series inductance in this embodiment, a different type of reactive component (e.g., a capacitance) can be coupled between the power management device 920 to ground to compensate for, for example, parasitic inductance within the power management device 920, in a close connector, or other device (that can effect signal integrity in an undesirable fashion). In some embodiments, a reactive components such as the tuning inductance 922, can be included in the input power protection device 900 to compensate for reactance (e.g., reactance introduced by inherent capacitance or inductance) associated with one or more connectors associated with the input power protection device 900, a package of the input power protection device 900, one or more components outside of the input power protection device 900 (e.g., a load), and/or so forth.

In some embodiments, the input power protection device configuration shown in FIG. 9 (and the other figures above), which include a power management device, can enable the design of a relatively low cost input power protection device that provides approximately the same level (or higher level) of power protection and signal integrity than a standalone shunt device(s). This can be achieved with lower performance shunt devices (e.g., shunt devices with relatively high capacitance and/or relatively high trigger voltages) than would be included in the standalone shunt device (which would be the only solution).

Figure 10:
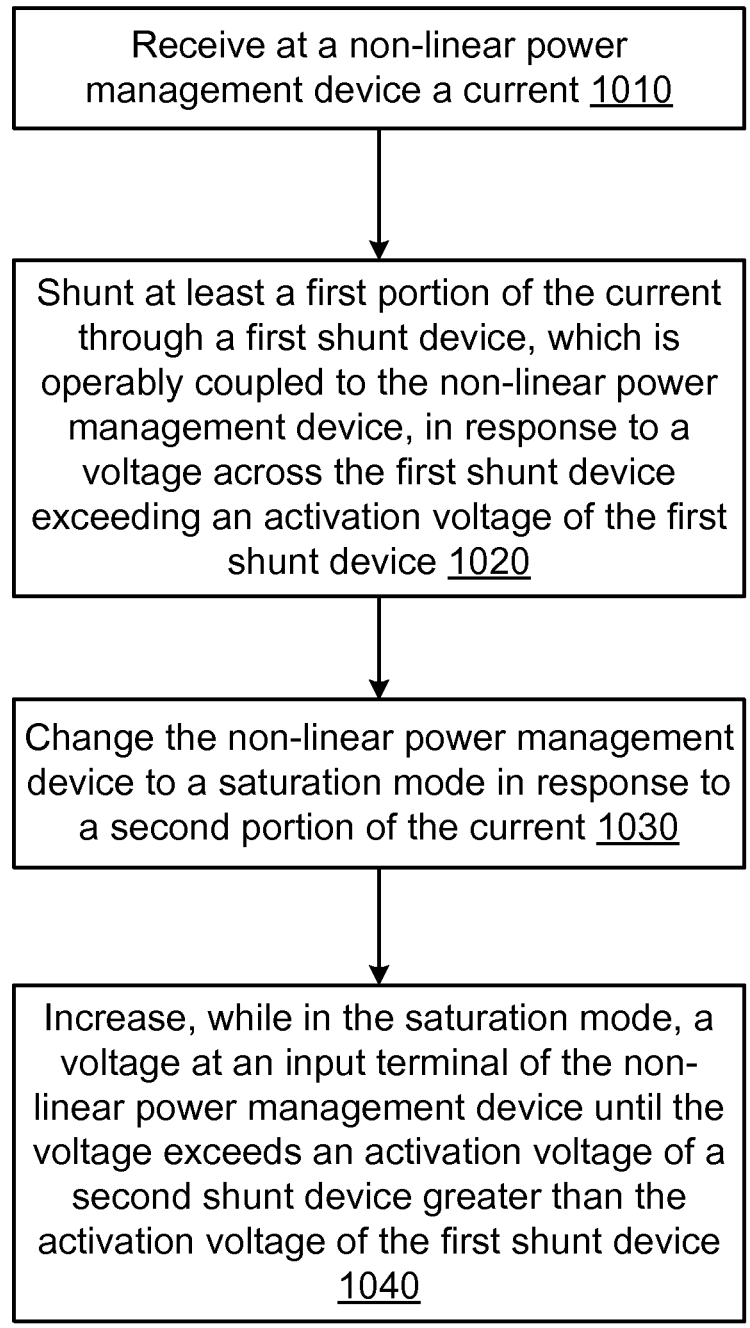
FIG. 10 is a flowchart that illustrates a method for operating an power management device.

FIG. 10 is a flowchart that illustrates a method for operating a power management device. As shown in FIG. 10, a current is received at a non-linear power management device (block 1010). In some embodiments, the current can be associated with an energy pulse. The non-linear power management device can be a non-linear power management device included in any of the embodiments described herein. For example, the non-linear power management device can be power management device 120 described in connection with FIG. 1A. In some embodiments, the non-linear power management device can be an internal or an external non-linear power management device.

At least a first portion of the current is shunted through a first shunt device, which is operably coupled to the non-linear power management device, in response to a voltage across the first shunt device exceeding a trigger voltage of the first shunt device (block 1020). In some embodiments, the first portion of the current may be passed through the non-linear power management device. In some embodiments, the first shunt device can be, for example, a zener diode. In some embodiments, the trigger voltage of the first shunt device can be a breakdown voltage. In some embodiments, the first shunt device can be an internal shunt device. In some embodiments, the first shunt device can be connected to an output terminal of the non-linear power management device.

The non-linear power management device is changed to a saturation mode in response to a second portion of the current (block 1030). In some embodiments, the non-linear power management device can be a diode-connected transistor. In some embodiments, when in the saturation mode, the non-linear power management device may be configured to pass a current that increases only slightly with relatively large changes in voltage across the non-linear power management device. In some embodiments, the non-linear power management device can be configured to change from a non-saturated mode to the saturation mode. When in the non-saturated mode, in some embodiments, the non-linear power management device can be configured to have a relatively low resistance to substantially reduce an impact to a signal through the non-linear power management device. In some embodiments, when in the non-saturated mode, the non-linear power management device may have a linear or a non-linear current versus voltage characteristic.

While in the saturation mode, a voltage at an input terminal of the non-linear power management device is increased until the voltage exceeds a trigger voltage of a second shunt device greater than the trigger voltage of the first shunt device (block 1040). In some embodiments, the second shunt device can be, for example, a zener diode, and the trigger voltage of the second shunt device can be a breakdown voltage. In some embodiments, the second shunt device can be an external shunt device or can be an internal shunt device. In some embodiments, the second shunt device can be coupled to an input terminal of the non-linear power management device. In some embodiments, the non-linear power management device can be serially coupled between the first shunt device and the second shunt device.

In some embodiments, the operation of the input power protection device can be summarized as follows: (1) Current associated with an energy pulse can turn on (e.g., activate, trigger shunting) an output shunt device coupled to an output of a power management device; (2) resistance of the power management device can produce a voltage delta between the output shunt device and an input shunt device coupled to an input of the power management device; (3) the voltage delta across the power management device can allow (or trigger) the input shunt device to turn on (e.g., activate, trigger shunting); and (4) the input shunt device and the output shunt device can mutually manage power associated with the energy pulse.

Implementations of the various techniques described herein may be implemented in digital electronic circuitry, or in computer hardware, firmware, software, or in combinations of them. Portions of methods may be performed by, and an apparatus (e.g., the input power protection device, the power management device) may be implemented within, special purpose logic circuitry, e.g., an FPGA (field programmable gate array) or an ASIC (application-specific integrated circuit).

Some implementations may be implemented using various semiconductor processing and/or packaging techniques. Some embodiments may be implemented using various types of semiconductor processing techniques associated with semiconductor substrates including, but not limited to, for example, Silicon (Si), Galium Arsenide (GaAs), Silicon Carbide (SiC), and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a non-linear power management device having an output terminal configured to be coupled to an output shunt device configured to shunt energy in response to a voltage across the output shunt device exceeding a trigger voltage of the output shunt device, the non-linear power management device configured to change to a saturation mode in response to a first current associated with an energy pulse through the non-linear power management device, the non-liner power management device having a gate shorted to the output terminal; and
an input shunt device coupled to an input terminal of the non-linear power management device and having a trigger voltage higher than the trigger voltage of the output shunt device, the input shunt device configured to shunt a second current associated with the energy pulse in response to a voltage drop across the non-linear power management device.

2. The apparatus of claim 1, wherein the non-linear power management device is configured to change from a linear mode to the saturation mode, the non-linear power management device, when in the linear mode, has a current-voltage characteristic that is different than a current-voltage characteristic of the non-linear power management device when in the saturation mode.

3. The apparatus of claim 1, wherein the non-linear power management device is configured to cause a voltage across the input shunt device to exceed the trigger voltage of the input shunt device while the non-linear power management device is in the saturation mode.

4. The apparatus of claim 1, wherein the input shunt device is configured to shunt the second current and clamp the voltage across the non-linear power management device below a trigger voltage of the non-linear power management device.

5. The apparatus of claim 1, wherein a voltage across the input shunt device increases to a voltage greater than the trigger voltage of the output shunt device in response to the non-linear power management device.

6. The apparatus of claim 1, wherein the input shunt device has a voltage across the input shunt device that is substantially limited to the trigger voltage of the output shunt device until the non-linear power management device changes to the saturation mode.

7. The apparatus of claim 1, wherein the input shunt device is a first input shunt device,
the apparatus further comprising:
a second input shunt device coupled in parallel to the first input shunt device and having a trigger voltage higher than the trigger voltage of the input shunt device.

8. The apparatus of claim 1, wherein the second current associated with the energy pulse is smaller than the first current associated with the energy pulse.

9. The apparatus of claim 1, wherein the energy pulse includes an electrostatic discharge event.

10. The apparatus of claim 1, wherein the energy pulse includes an inductive energy transient.

11. The apparatus of claim 1, wherein the non-linear power management device and the input shunt device collectively provide downstream overvoltage and overcurrent protection.

12. The apparatus of claim 1, wherein the non-linear power management device and the input shunt device are integrated into a single, discrete component.

13. The apparatus of claim 1, wherein the non-linear power management device includes a saturating transistor structure coupled in series between the input shunt device and the output shunt device.

14. The apparatus of claim 1, wherein the non-linear power management device includes a gallium arsenide semiconductor.

15. The apparatus of claim 1, wherein the non-linear power management device includes a saturating semiconductor material.

16. The apparatus of claim 1, wherein the non-linear power management device includes a saturating material including a conductive polymer.

17. The apparatus of claim 1, wherein the non-linear power management device is a first non-linear power management device,
the apparatus further comprising:
a second non-liner power management device coupled in parallel to the first non-linear power management device via the input shunt device.

18. The apparatus of claim 1, further comprising:
a reactive component coupled in series with the non-linear power management device and configured to compensate for detuning capacitance associated with at least one of the input shunt device or the output shunt device.

19. The apparatus of claim 1, further comprising:
a reactive component coupled in series with the non-linear power management device, the reactive component is integrated into a single, discrete component with at least one of the non-linear power management device or the input shunt device.

20. The apparatus of claim 1, wherein the input shunt device is first input shunt device that is grounded,
the apparatus, further comprising:
a second input shunt device coupled to the first input shunt device, the second input shunt device referenced to a non-ground node.

21. The apparatus of claim 1, wherein the input shunt device is configured to shunt the second current and clamp the voltage across the non-linear power management device below a failure voltage of the non-linear power management device.

22. A method, comprising:
receiving at a non-linear power management device a current, at least a first portion of the current being passed through the non-linear power management device and shunted through a first shunt device, which is operably coupled to the non-linear power management device, in response to a voltage across the first shunt device exceeding a trigger voltage of the first shunt device;
changing the non-linear power management device to a saturation mode in response to a second portion of the current, the non-linear power management device having a gate shorted to a source; and
increasing, while in the saturation mode, a voltage at an input terminal of the non-linear power management device until the voltage exceeds a trigger voltage of a second shunt device greater than the trigger voltage of the first shunt device.

23. The method of claim 22, wherein the changing includes changing from a linear mode to the saturation mode, when the non-linear power management device is in the linear mode, a current-voltage characteristic of the non-linear power management device has a slope that is different than a slope of a current-voltage characteristic of the non-linear power management device when the non-linear power management device is in the saturation mode.

24. The method of claim 22, wherein the first shunt device is configured to substantially limit a voltage across the second shunt device to the trigger voltage of the first shunt device until the changing of the non-linear power management device to the saturation mode.

25. The method of claim 22, wherein the increasing of the voltage at the input terminal of the non-linear power management device is triggered in response to the changing of the non-linear power management device to the saturation mode.

26. The method of claim 22, wherein the second portion of the current remains substantially at a constant current level during the increasing.

27. The method of claim 22, wherein the second portion of the current decreases during the increasing.

28. The method of claim 22, wherein the second portion of the current is included in the first portion of the current.

29. The method of claim 22, wherein at least a portion of the second portion of the current is generated by the first shunt device.

30. An apparatus, comprising:
an input terminal configured to be coupled to an input shunt device;
an output terminal configured to be coupled to an output shunt device; and
a non-linear element disposed between the input terminal and the output terminal, the non-linear element having a non-linear current-voltage behavior, the non-linear element configured to trigger the input shunt device to change to a shunting state in response to a current drawn through the non-linear element by the output shunt device, the non-linear element having a gate shorted to the output terminal.

31. The apparatus of claim 30, further comprising:
a reactive component coupled in series with the non-linear element and configured to compensate for detuning capacitance associated with at least one of the input shunt device or the output shunt device.

32. The apparatus of claim 30, wherein the input shunt device has a trigger voltage higher than a trigger voltage of the output shunt device, the non-linear element is serially disposed between the output shunt device and the input shunt device.

33. The apparatus of claim 30, wherein the input shunt device has a trigger voltage lower than a trigger voltage of the output shunt device, the non-linear element is serially disposed between the output shunt device and the input shunt device.

34. The apparatus of claim 30, wherein the input terminal, the output terminal, and the non-linear element collectively define a non-linear power management device, the non-linear element is configured to change to a saturation mode before triggering the input shunt device to change to the shunting state, the non-linear element is configured to substantially limit a current through the output shunt device when the non-linear element is in the saturation mode.

* * * * *